United States Patent
Colombier et al.

(10) Patent No.: US 12,062,062 B2
(45) Date of Patent: Aug. 13, 2024

(54) MISSED REVENUE AND ANALYSIS BASED ON COMPETITOR DATA

(71) Applicant: Content Square SAS, Paris (FR)

(72) Inventors: Michael Colombier, Paris (FR); Fatiha Achour, Paris (FR); Martin De Charette, Paris (FR); Manuel Cornu, Paris (FR); Alfredo Castro, Paris (FR); Filipe Posteral, Paris (FR); Krongkarn Jitsil, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/090,758

(22) Filed: Dec. 29, 2022

(65) Prior Publication Data

US 2023/0214864 A1 Jul. 6, 2023

Related U.S. Application Data

(60) Provisional application No. 63/295,412, filed on Dec. 30, 2021.

(51) Int. Cl.
G06Q 30/0201 (2023.01)
G06Q 30/0203 (2023.01)

(52) U.S. Cl.
CPC ..... *G06Q 30/0206* (2013.01); *G06Q 30/0203* (2013.01)

(58) Field of Classification Search
None
See application file for complete search history.

(56) References Cited

U.S. PATENT DOCUMENTS

| | | | | |
|---|---|---|---|---|
| 5,873,069 A | * | 2/1999 | Reuhl | G06Q 30/06 705/26.4 |
| 2002/0065912 A1 | * | 5/2002 | Catchpole | H04L 9/40 713/168 |

(Continued)

FOREIGN PATENT DOCUMENTS

WO 2015192106 12/2015

OTHER PUBLICATIONS

"International Application Serial No. PCT IB2022 062916, International Search Report mailed Feb. 13, 2023", 3 pgs.

(Continued)

*Primary Examiner* — Eric W Stamber
*Assistant Examiner* — Ashley Y Young
(74) *Attorney, Agent, or Firm* — Schwegman Lundberg & Woessner, P.A.

(57) ABSTRACT

Aspects of the present disclosure involve a system comprising a computer-readable storage medium storing a program and method to present missed revenue based on competitor data. The program and method provide for receiving indication of a user request to present missed revenue for at least one product made available for purchase by a website; determining a set of competitor products for the at least one product, each competitor product in the set of competitor products having a competitor product price; identifying, based on the determining, a first competitor product within the set of competitor products with a lowest competitor product price; calculating a missed revenue for the at least one product based at least in part on a difference between the product price and the lowest competitor product price for a given time period; and causing display of the missed revenue in association with the at least one product.

18 Claims, 10 Drawing Sheets

(56) References Cited

U.S. PATENT DOCUMENTS

| | | | |
|---|---|---|---|
| 2002/0083067 A1* | 6/2002 | Tamayo | G06F 16/958 |
| 2002/0116213 A1* | 8/2002 | Kavounis | G06Q 10/06 |
| | | | 705/1.1 |
| 2004/0059624 A1* | 3/2004 | Wantulok | G06Q 30/0203 |
| | | | 705/7.32 |
| 2015/0066569 A1* | 3/2015 | Ervolina | G06Q 10/06315 |
| | | | 705/7.25 |
| 2016/0162925 A1 | 6/2016 | Sundaresan | |
| 2017/0323026 A1* | 11/2017 | Le Bras | G06F 16/2358 |
| 2022/0129934 A1* | 4/2022 | Yeung | G06Q 30/0201 |

OTHER PUBLICATIONS

"International Application Serial No. PCT IB2022 062916, Written Opinion mailed Feb. 13, 2023", 5 pgs.

* cited by examiner

FIG. 7

“MISSED REVENUE AND ANALYSIS BASED ON COMPETITOR DATA”

CLAIM OF PRIORITY

This Application claims the benefit of priority to U.S. Provisional Application No. 63/295,412, filed Dec. 30, 2021, which is hereby incorporated by reference in its entirety.

BACKGROUND

Web analysis solutions provide for the collection and analysis of website data. Such solutions may provide for the analysis of individual webpage visits, including merchandising analysis.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 7 illustrates an example user interface for presenting a list of products based on KPIs, in accordance with some examples.

DETAILED DESCRIPTION

Web analysis solutions provide for the collection and analysis of website data. Such solutions may provide for merchandising analysis.

The disclosed embodiments provide an experience analytics system which implements merchandising analysis based on one or more of: the merchandise to be promoted on the website, optimization of sales performance, the items in the client's product catalog on a granular level, competitor pricing, etc. The experience analytics system may present a merchandising interface with graphical data visualization pertaining to product opportunities, category, brand performance, etc.

The merchandising interface includes an interface element that allows a user (e.g., administrator, operator) to view products by category, brand, or product catalog. In addition, the merchandising interface identifies and presents product(s) that are cheapest among competitors of the website (e.g., based on stored competitor pricing information). Further, the merchandising interface indicates a respective missed revenue for such product(s), based on the product price of the merchant compared to that of the competitors.

Thus, the disclosed embodiments provide for receiving a user request to present missed revenue for a product. A set of competitor products is determined for the product, with each competitor product having a corresponding competitor product price. A first competitor product is identified within the set of competitor products with a lowest competitor product price. A missed revenue is calculated for the product based at least in part on a difference between the product price and the lowest competitor product price for a given time period. The missed revenue is displayed in association with the at least one product.

Networked Computing Environment

Figure 1:
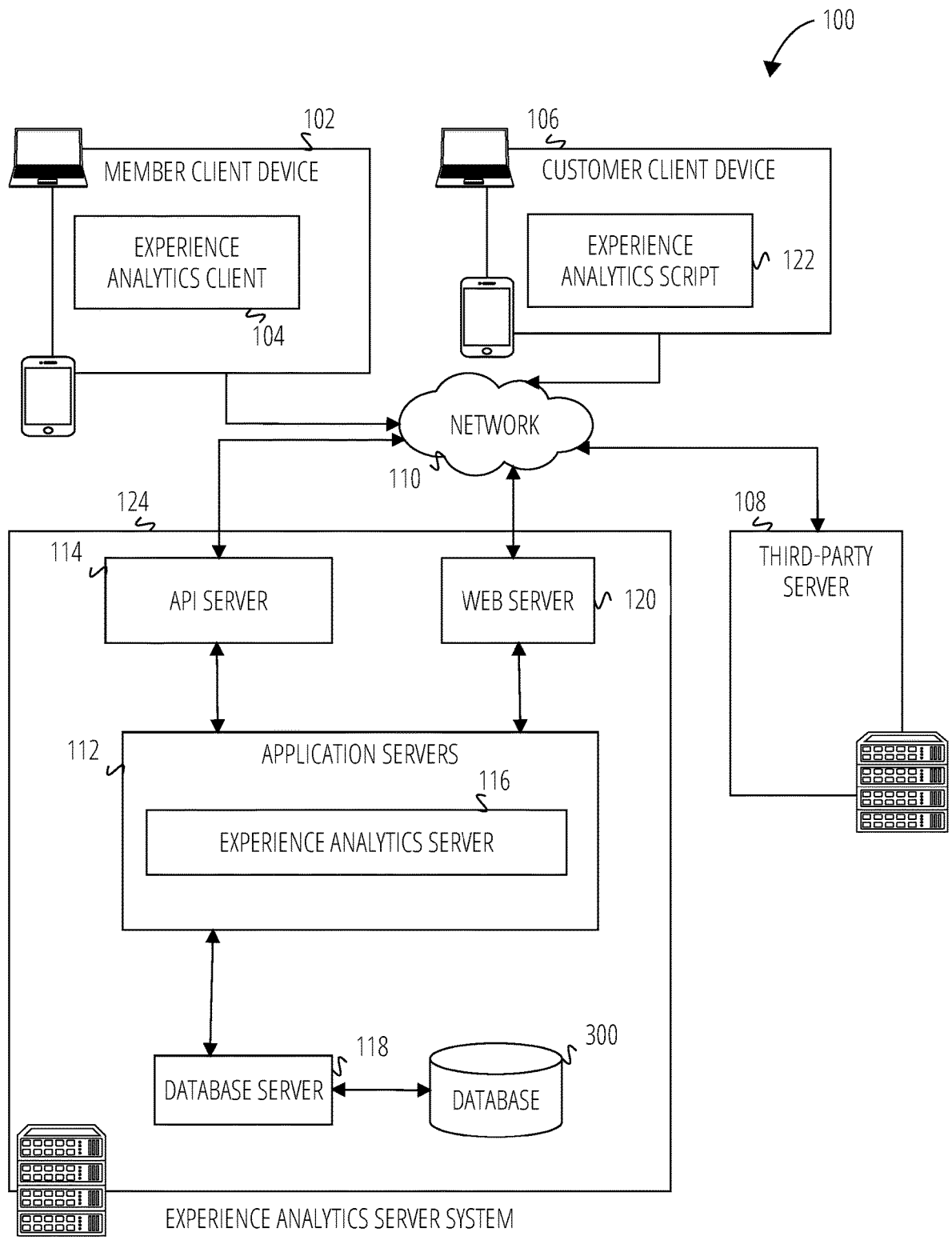
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
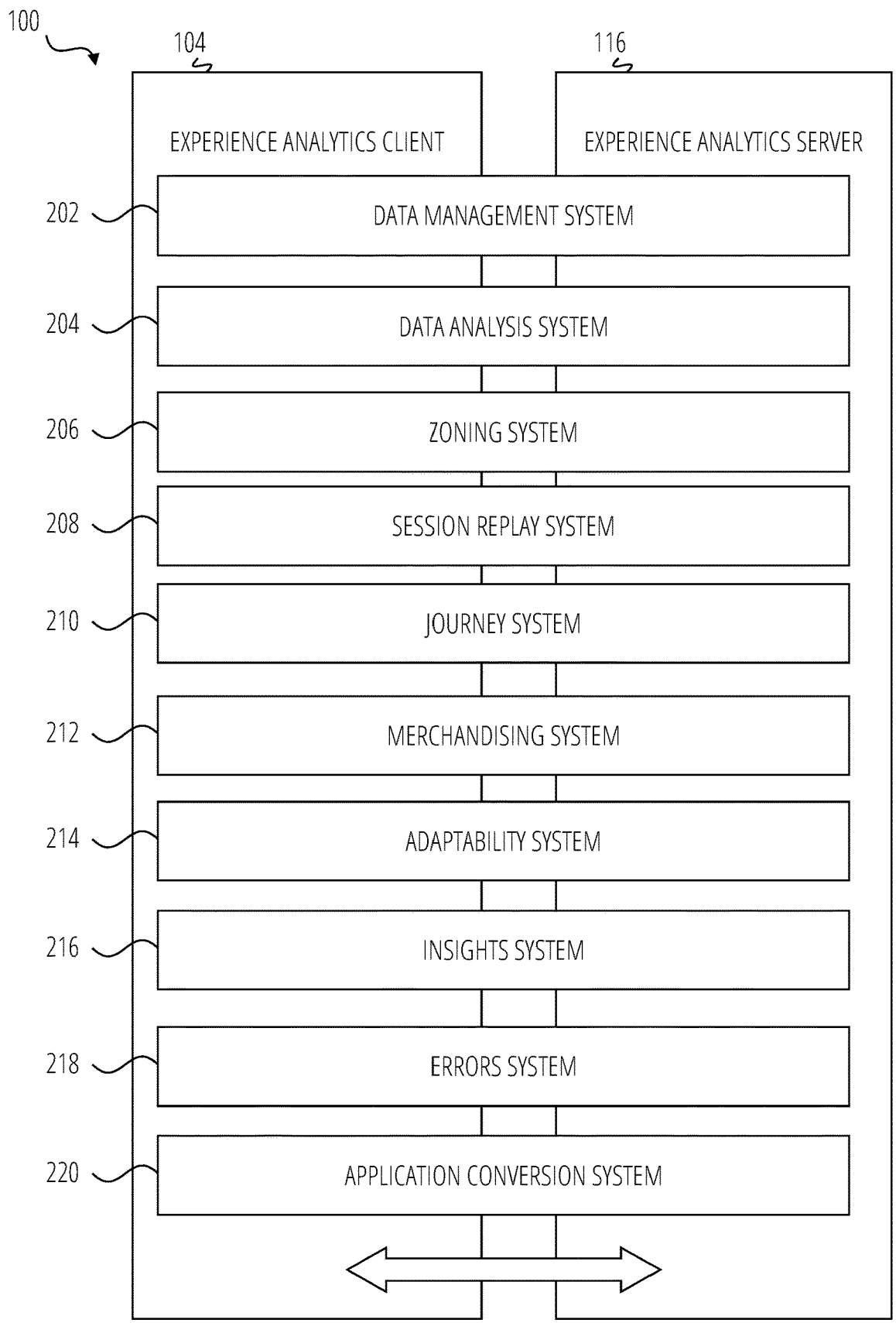
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's web site to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

Data Architecture

Figure 3:
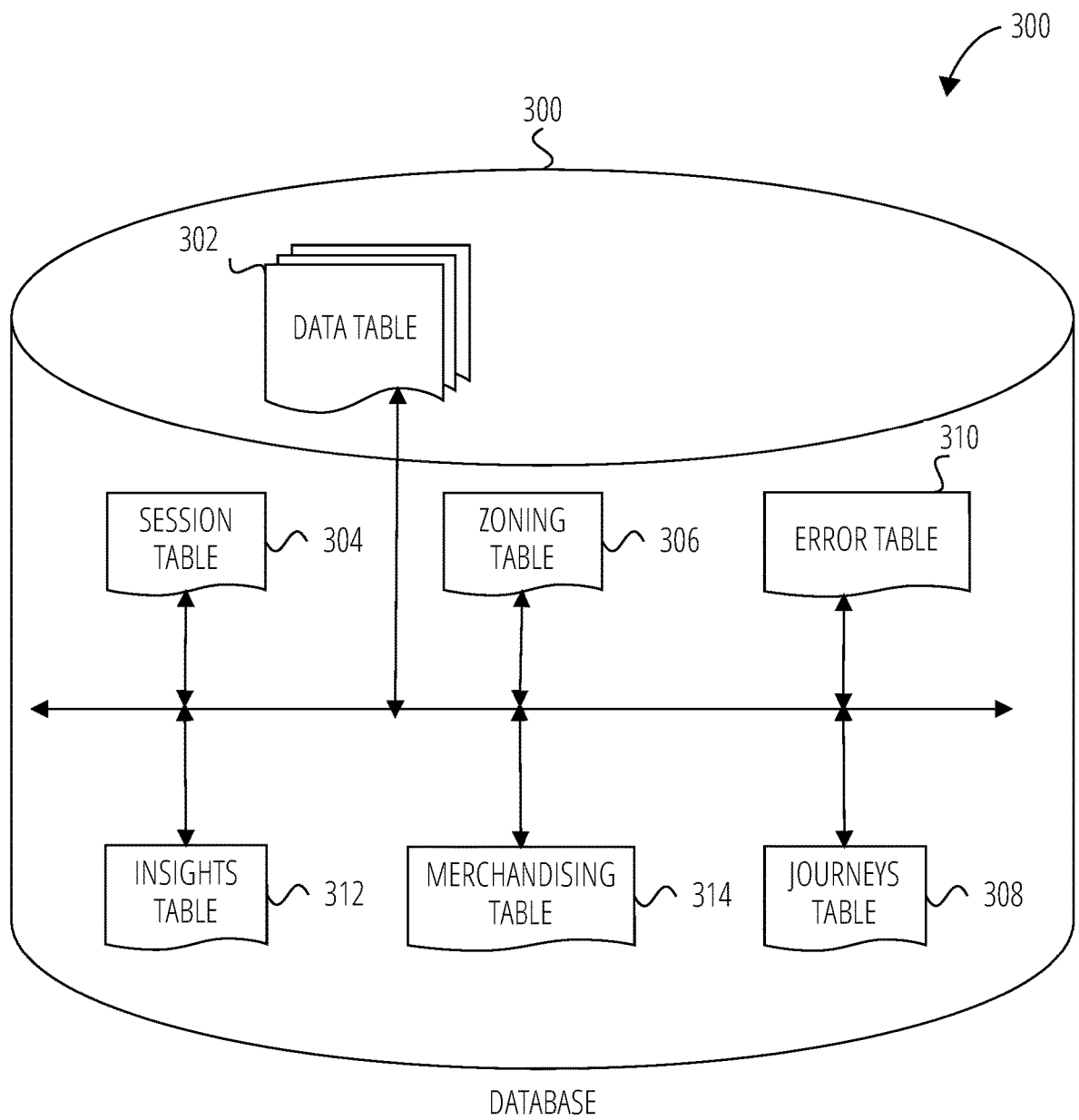
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the web site, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients (e.g., including competitor pricing), the data associated with the products on the websites and applications, the analytics on the product opportunities and the performance of the products based on the zones in the website or application, etc.

Figure 4:
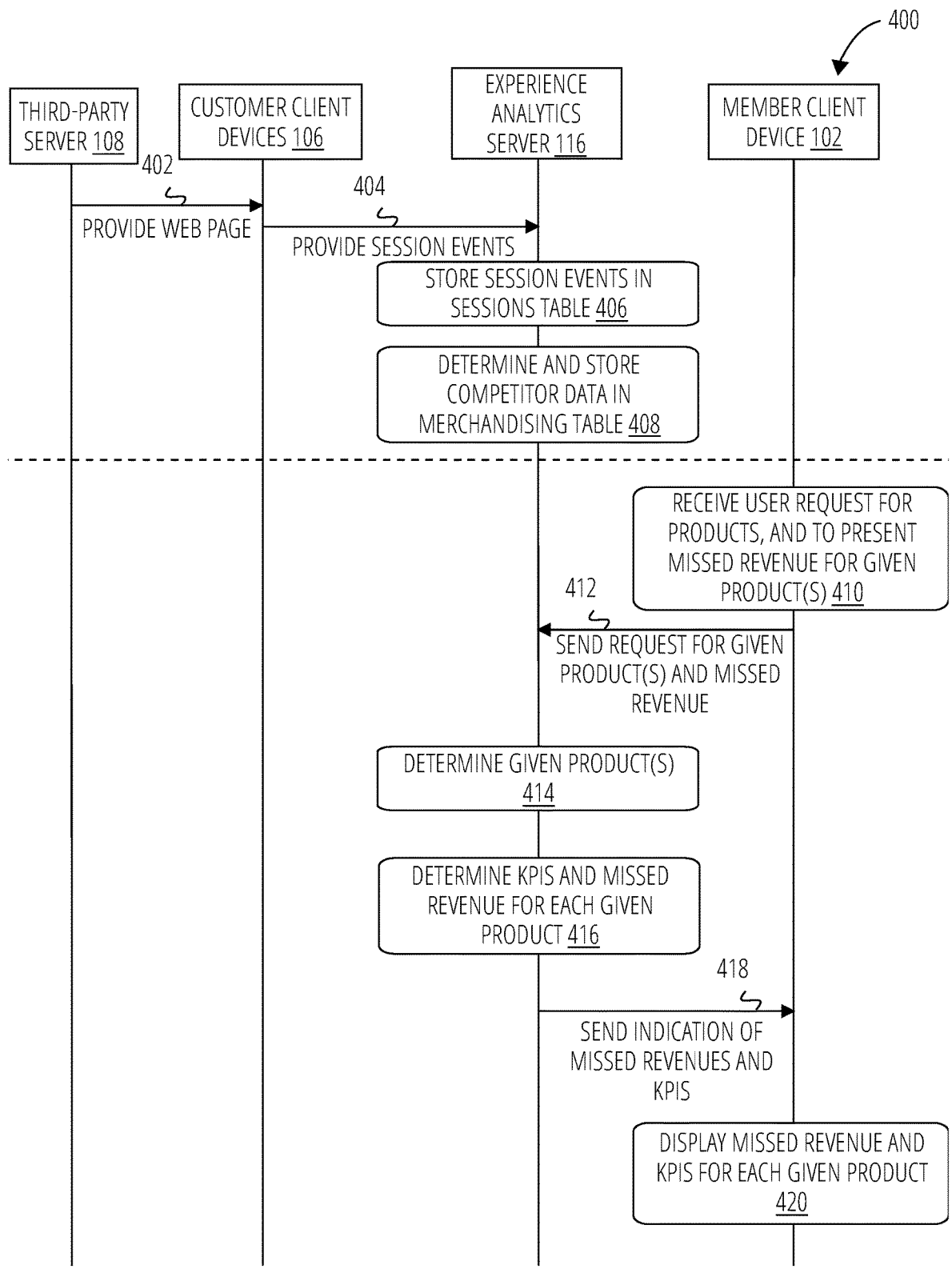
FIG. 4 is an interaction diagram illustrating a process for presenting missed revenue based on competitor data, in accordance with some examples.

FIG. 4 is an interaction diagram illustrating a process 400 for presenting missed revenue based on competitor data, in accordance with some examples. For explanatory purposes, the process 400 is primarily described herein with reference to the member client device 102, the customer client devices 106, the third-party server 108, and the experience analytics server 116 of FIG. 1. However, one or more blocks (or operations) of the process 400 may be performed by one or more other components, and/or by other suitable devices. Further for explanatory purposes, the blocks (or operations) of the process 400 are described herein as occurring in serial, or linearly. However, multiple blocks (or operations) of the process 400 may occur in parallel or concurrently. In addition, the blocks (or operations) of the process 400 need not be performed in the order shown and/or one or more blocks (or operations) of the process 400 need not be performed and/or can be replaced by other operations. The process 400 may be terminated when its operations are completed. In addition, the process 400 may correspond to a method, a procedure, an algorithm, etc.

In the example of FIG. 4, operations 402-408 correspond to a first phase which relates to storing web site session events (e.g., user interactions). Moreover, operations 410-420 correspond to a second phase which relates to presenting missed revenue for given product(s). It may be understood that the second phase may occur shortly after the first phase, or after an extended period of time after the first phase. As such, FIG. 4 includes a dashed line separating the first phase and the second phase for illustrative purposes.

At operation 402, the third-party server 108 provides a web page to one or more customer client devices 106. As noted above, a user at a customer client device 106 can access a website (e.g., corresponding to a member of the experience analytics system 100) that is hosted on the third-party server 108 via the network 110 using an Internet browsing application.

The customer client devices 106 provide session events to the experience analytics server 116 (operation 404). In one or more embodiments, the session events are user interactions with one or more elements, sections, zones (e.g., as defined by the zoning system 206), or the like, of the webpage provided at operation 402. Session events may include user input of entering text in a text box, clicking a button with a mouse, tapping a button with a touchscreen, navigating to a webpage, navigating away from a webpage, scrolling up or down on the webpage, hovering over a webpage element, URL(s) visited, time spent on a certain web page, purchases made, items placed in a cart, and the like, as well as any combination thereof.

In one or more embodiments, the experience analytics server 116 is configured to associate particular session events based on identifiers assigned to products based on product catalog(s). As noted above, the merchandising table 314 is configured to store the product catalog, which includes granular data (e.g., attributes) for the various products made available by a website. It is possible for a website to provide multiple product catalogs, for example, corresponding to different geographical regions (e.g., continents, countries, states).

In one or more embodiments, the experience analytics server 116 is configured to generate the product catalog based on a catalog file provided by an administrator (e.g., agent) of the client corresponding to the website. The catalog file identifies the list of products made available by the website. For each listed product, the catalog file includes product attributes such as, but not limited to: all categories and sub-categories associated with the product (e.g., guys>bottoms>jeans), a brand of the product, a stock-keeping unit (SKU) of the product, a European Article Numbers (EAN) of the product, a name/description of the product, a price of the product and any minimum and/or maximum prices associated therewith, stock information for the product and/or variants of the product. In one or more embodiments, the session events provided at operation 404 include or otherwise indicate one or more of these product attributes.

At block 406, the experience analytics server 116 continuously stores the session events in the session table 304 of the database 300. For example, the data management system 202 is configured to receive the session events from the customer client devices 106, and to store the session events in the session table 304 in association with session recording. In one or more embodiments, session recording may be executed by generating one or more logs, lists, and the like, of such events, as detected by an experience analytics script 122 included in the webpage accessed by the customer client devices 106. Such logs, lists, and the like, may include one or more event descriptors including the event type, the event target, such as a specific button or text box, the event time, and the like, as well as combinations thereof.

In one or more embodiments, the session events are aggregated across multiple customer client devices 106 accessing the website (e.g., all website customers), and for an extended period of time (e.g., a month, a year, or the like). In this manner, a sufficient amount of user interactions with respect to purchases is recorded, for example, to generate cross-sell data for given products.

Storage of session events in the session table 304 may include storage of events in one or more formats including, as examples and without limitation, sets of session events, single-feature session replays, such as session-length recordings, other, like, formats, and any combination thereof. Further, storage of session recordings may include the storage of one or more associated data features, including, as examples and without limitation, analytic data, metadata, and the like, as well as any combination thereof.

At block 408, the experience analytics server 116 stores competitor data in the merchandising table 314. For example, the merchandising system 212 is configured to determine, for each product within the product catalog(s), the competitors (e.g., resellers) who sell the product and the price offered by the competitor. In one or more embodiments, the merchandising system 212 (e.g., in conjunction with the data analysis system 204) is configured to access the competitor data from an on-line retailer, for example, based on web-scraping techniques and/or third-party services that provide competitor data. The competitor data may be updated within the merchandising table 314 on a periodic basis (e.g., weekly, daily, hourly or in real-time).

As noted above, operations 410-420 correspond to the above-noted second phase and relate to a member client device 102. The member client device 102 may correspond to a client (e.g., a retail store) of the experience analytics system 100, where the client has a website hosted on the third-party server 108. The user of the member client device 102 may be an agent (e.g., a web administrator, an employee, etc.) of the client. In addition, the member client device 102 includes the experience analytics client 104.

As described herein, the experience analytics system 100 is configured to provide for display of missed revenue with respect to an analysis context. Alternatively, the experience analytics system 100 is configured to provide for display of competitor data to display competitor offers for one or more given products.

As discussed below with respect to FIG. 5, the merchandising system 212 provides for display of a user interface with interface element(s) which are user-selectable to browse products based on one or more product attributes. With respect to the above-mentioned analysis context (e.g., missed revenue, discussed below with respect to FIG. 6), the user interface includes respective interface elements to: select a particular product catalog for a web site (e.g., based on region such as continent, country and/or state); browse products by brand, by one or more categories (and/or sub-categories), or by a specific product; browse products by device (e.g., desktop, mobile, tablet, or combinations thereof); browse products by time period; and/or browse products by segment (e.g., various user segments based on goals, user actions, session attributes and/or merchandising actions as discussed below with respect to FIG. 5). On the other hand, with respect to competitor data (e.g., discussed below with respect to FIG. 7 and FIGS. 8A-8C), the user interface provides for browsing products by product, category and/or brand (e.g., without browsing by device, time period and/or segment).

As discussed below with respect to FIG. 5, the user interface includes an interface element which is user-selectable to present missed revenue for given product(s). Thus, at block 410, the member client device 102 receives a user request for given product(s), and to present product opportunities for the given product(s). The request may indicate one or more product attributes (e.g., context, device, time period, segment) selected by the user, for analysis. In response to receiving the request, the member client device 102 sends a request to determine the product(s) for browsing, and to analyze (e.g., determine missed revenue for) such product(s) (operation 412).

At block 414, the experience analytics server 116 determines the products that match the attributes selected by the user at block 410, based on respective product attributes as stored in the product catalog(s). For example, the experience analytics server 116 identifies products within the selected product catalog that match the product attributes (e.g., context, device, time period, segment) selected by the user in block 410.

The experience analytics server 116 determines, for each of the given product(s), KPIs for the given product and missed revenues that relate to the competitor products (block 416). Regarding KPIs, the data analysis system 204 is configured to analyze the session events as stored in the session table 304 in association with the product catalog stored in the merchandising table 314. The data analysis system 204 is configured to perform data science and data engineering processes on the stored session data, in order to generate KPIs for each given product. The KPIs may be limited to the time period specified by the user at block 410.

In one or more embodiments, KPIs are determined on a per-product basis. For a given product, examples of KPIs include, but are not limited to:
  a number of visits which corresponds to the number of sessions that have seen the product page at least once during the visit, and is calculated as the number of sessions with at least one view of the product page of the product;
  a conversion rate which corresponds to the percentage of sessions that purchased the product after seeing the product page or sessions when the product was purchased (e.g., this is in case of a new session with an already-existing cart), and is calculated as the number of sessions buying the product divided by the number of sessions with at least one view of the product page or sessions that purchased the product;

a number of conversions which corresponds to the number of sessions with at least one conversion (e.g., purchase) of the product, and is calculated as the number of sessions with at least one conversion of the product;

a revenue which corresponds to the revenue generated by the sales of the product, and is calculated by the sum of the revenue of the product;

units sold which corresponds to the number of units of the product that have been sold, and is calculated by sum of the quantity of the product;

product price which corresponds to the price of the product, and is calculated by the price of the product from the product catalog. If the product has variants, the product price corresponds to the minimum and maximum prices of the variants of the product, and is calculated by minimum and maximum prices of the variants of the product from the product catalog;

market price which corresponds to the market price over the last 24 hours, and is calculated by the average price of the competitors product on the market in the last 24 hours. If the product has variants, the market price does not apply;

a price difference which corresponds to the average difference of price between my product and its competitors on the market, and is calculated by the average for each competitor on the product, namely (Competitor Price−Product Price)/Product price The above list of KPIs are examples that may be determined by the experience analytics server 116, in response to the user request at block 410 for missed revenue. The experience analytics server 116 may calculate one or more of the above-listed KPIs in conjunction with determining missed revenues for each given product. As noted above, the given product(s) may be based on one or more of product catalog, categories (and/or sub-categories), specific product, device, time period and/or segment as selected by the user.

With respect to missed revenue, the merchandising system 212 determines which of the given product(s) has a product price that is less than all competitor product prices. In doing so, the merchandising system 212 may access the competitor data stored in the block 408 and determine the lowest competitor product price for the user-specified time period.

For each given product that is less than its lowest competitor price, the merchandising system 212 determines a missed revenue for the given product. The missed revenue is based at least in part on a difference between the product price and the lowest competitor product price for a given time period. For example, the missed revenue may correspond to a summation of missed revenue across multiple days (e.g., corresponding to the given time period) for a given product. The missed revenue represents an opportunity to increase the product price for the given product. For example, an administrator associated with the client website may decide to increase the product price while remaining less than the cheapest competitor price, for increased revenue.

At operation 418, the experience analytics server 116 sends an indication of the missed revenues and KPIs to the member client device 102. The member client device 102 displays, for each given product, the missed revenues and KPIs for the given product (block 420).

Thus, in the example of FIG. 4, the experience analytics system 100 provides for determining missed revenues for given product(s) (e.g., based on time period, device, segment, and the like). The missed revenues are based at least in part on a difference between the product price and a lowest competitor product price for a given time period (e.g., a summation across multiple days). An example interface which includes missed revenues is shown below with respect to FIG. 6.

In one or more embodiments, the experience analytics system 100 separately provides for displaying competitor data. As discussed below with respect to FIG. 7 and FIGS. 8A-8C, the experience analytics server 116 is configured to display a user interface with competitor data, based on browsing products by as the product, category and/or brand level. The merchandising system 212 is configured to determine a set of matching competitor products for each of the given product(s).

In one or more implementations, the merchandising system 212 accesses the merchandising table 314, to identify the set of competitor products for each given product. The competitor products may be matched by EAN, SKU, product name, product description, or a combination thereof. For each competitor product, the merchandising system 212 determines the name of the competitor, the identifying information for the competitor product (e.g., which may exactly match or slightly vary from that of the given product), and/or the price of the competitor product.

Moreover, the experience analytics server 116 is configured to present competitor data for given product(s), given competitor(s) and/or based on a competitor list. By way of nonlimiting example, for each competitor offer, the experience analytics server 116 is configured to calculate the price difference (e.g., in %) between the product price and that of the competitor.

Figure 5:
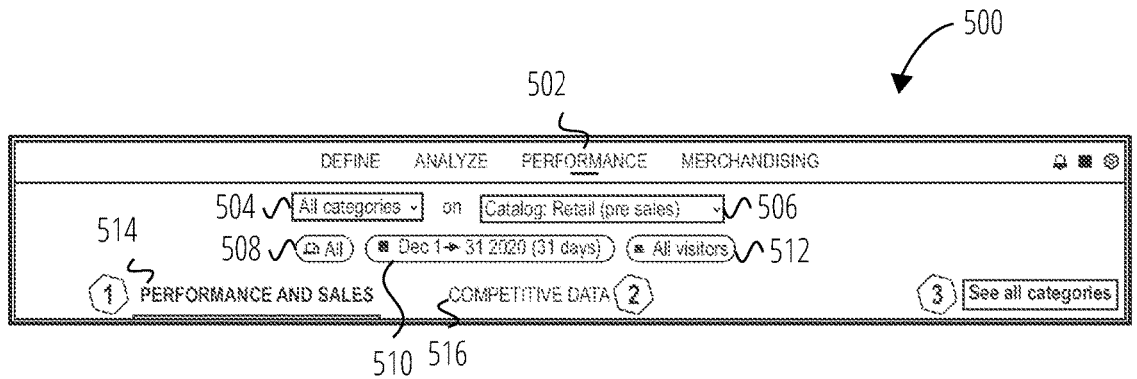
FIG. 5 illustrates an example user interface for browsing products, in accordance with some examples.

FIG. 5 illustrates an example user interface 500 for browsing products, in accordance with some examples. The user interface 500 is displayable on a member client device 102, which is operated by an agent (e.g., a web administrator, an employee, etc.) of the client corresponding to a website. The user interface 500 includes a performance interface tab 502, a context selector 504, a catalog selector 506, a device selector 508, a time period selector 510, a segment selector 512 a performance and sales tab 514, and a competitive data tab 516.

The user interface 500 provided by the merchandising system 212 allows a user (e.g., agent) to browse products based on category, brand or a specific product (e.g., via context selector 504), and further based on selections via the selectors 506-512. Values presented within the user interface 500 are based on KPIs determined by the data analysis system 204. As noted above, the KPIs are based at least in part on data stored within the merchandising table 314 (e.g., product catalogs) and/or the session table 304 (e.g., session activity). In one or more embodiments, KPIs are calculated in real-time to accommodate user-specified time periods as described herein.

The context selector 504 is user-selectable to browse products by category (and/or subcategory), brand and/or a specific product. The catalog selector 506 is user-selectable to browse products based on product catalog. For example, a product catalog may vary based on region (e.g., continent, country, state) with respect to available products, pricing, and the like. The device selector 508 is user-selectable to browse products based on the device used at the time of recording the session events. For example, the user may select between a desktop, mobile, tablet, or combinations thereof (e.g., all devices). The time period selector 510 allows the user to select a specific time period of the session events from which the KPIs are based. For example, the time period selector 510 allows the user to select among predefined time period (e.g., last 7 days, last month, last quarter, last year) and/or to select a custom date range.

The segment selector 512 is user-selectable to select between different user segments. For example, user segments may be selected based on: goals; user actions including as bounce on page, click recurrence on zone, exit page (by goal), exit page (by goal), exit page (path), exit zone (last hovered), hesitation time on zone, hover time on zone, landing page (by goal), landing page (by path), number of pages viewed, page event, page reached, page viewed, scroll rate of page, time before first click on zone, time spent on page, zone clicked, zone hovered; session attributes including browser, custom variable, e-commerce transaction, error, geographical location, language, new/returning, number of sessions, operating system, referring URL, screen resolution, session duration; merchandising actions including category/brand product page views, category/brand purchase, product add to cart, product page views, product purchase; and combinations thereof.

With respect to the analysis context (e.g., missed revenue, discussed below with respect to FIG. 6), the user interface 500 includes all of the selectors 504-512. On the other hand, with respect to competitor data (e.g., discussed below with respect to FIG. 7 and FIGS. 8A-8C), the user interface 500 may be more limited, for example, by omitting selectors 508-512.

Figure 6:
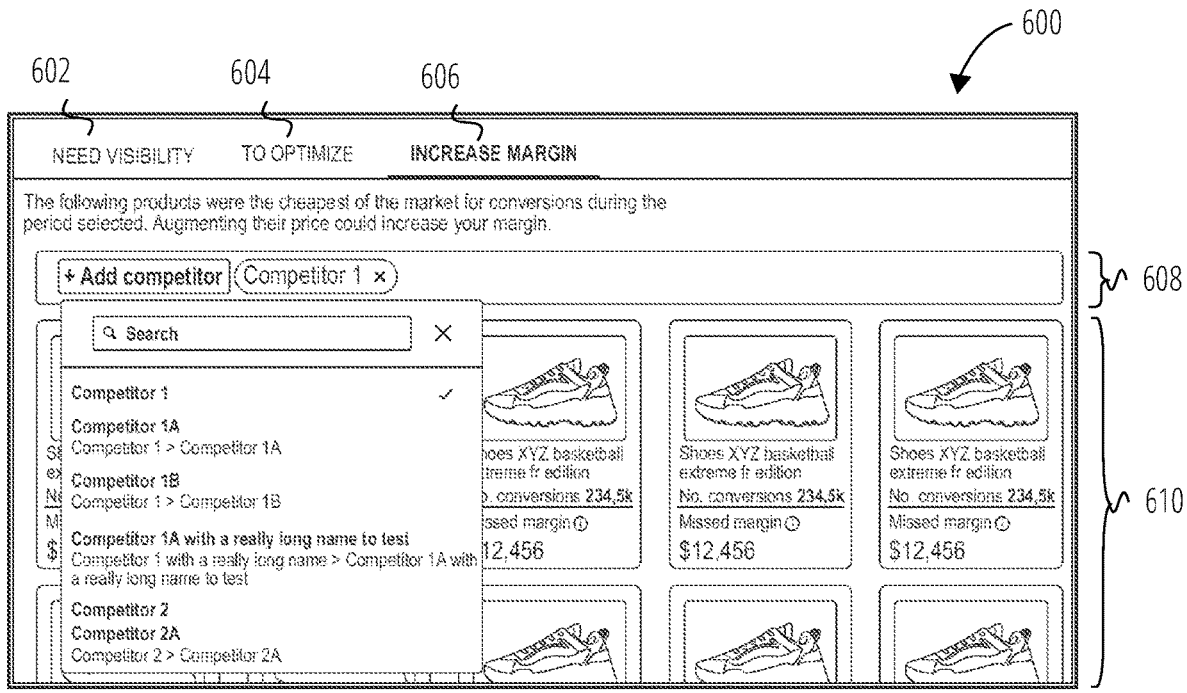
FIG. 6 illustrates an example user interface for displaying missed revenue based on competitor data, in accordance with some examples.

FIG. 6 illustrates an example user interface 600 for displaying missed revenue based on competitor data, in accordance with some examples. The user interface 600 includes a need visibility tab 602, an optimize tab 604, an increase margin tab 606, a list of competitors 608, and a list of products 610.

In one or more embodiments, the merchandising system 212 presents the user interface 600 in response to user input to view performance and sales data (e.g., via the performance and sales tab 514), and further user input to view missed revenue (e.g., via the increase margin tab 606).

As noted above, the user interface 500 of FIG. 5 includes selectors 504-512 for browsing products by context (e.g., category/subcategory, brand and/or specific product), catalog (e.g., by region), type of device, time period, and/or user segment. The merchandising system 212 presents the user interface 600 based on user selections via one or more of more of the selectors 504-512.

In one or more embodiments, the user interface 600 presents the user (e.g., agent) with product opportunities with respect to missed revenues. For example, the user interface 600 provides the user with an opportunity to increase the margin of product(s) based on competitor data.

In this regard, the user interface 600 includes the list of competitors 608 from which price comparisons are made. As noted above with respect to FIG. 5, the merchandising system 212 is configured to determine competitors with respect to given product(s). The names of such competitors are listed in the list of competitors 608, which can be modified by the user (e.g., to add and/or remove competitors for price comparison).

The merchandising system 212 is configured to identify products of the client (e.g., website) that were the cheapest among competitors (e.g., those specified within the list of competitors 608), and for which the price can be increased while still remaining the cheapest (e.g., among predefined competitors of the website). For example, this allows for the merchandising system 212 to optimize margin with respect to such "cheapest" products. The identified products are presented within the list of products 610.

As noted above, the merchandising table 314 within the database 300 is configured to store product prices in association with each of the selected competitors, and the merchandising system 212 is able to access the prices in order to suggest price adjustments as described herein.

Although not shown in the example of FIG. 6, it is possible for the merchandising system 212 to determine if is product is "too expensive," for example, via an additional tab. The merchandising system 212 may indicate such products as generally visible (e.g., above a threshold), does not convert a lot (e.g., based on a threshold), and that is more expensive than the competition. For example, this information may provide the user with an opportunity to lower the price of these products to potentially improve conversion rates.

In one or more embodiments, the need visibility tab 602 is user-selectable to indicate or otherwise suggest products of a given category/brand which "need visibility." Such products may have a good conversion rate, but are potentially not as seen on the website as much as deserved. In addition, the optimize tab 604 is user-selectable to surface products of given category/brand to optimize. Such products may be generally visible (e.g., based on a threshold value), but do not convert a lot.

Figure 7:
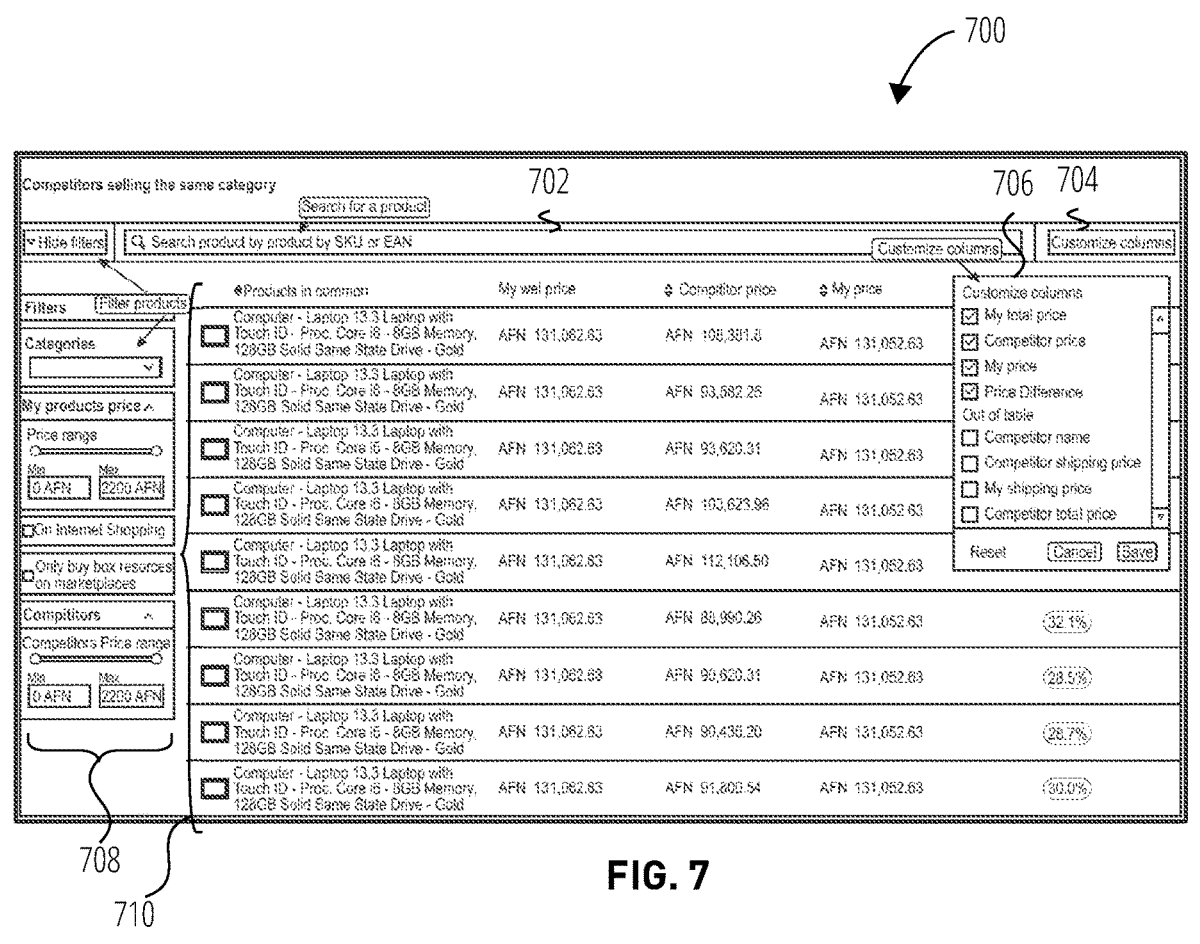

FIG. 7 illustrates an example user interface 700 for presenting a list of products with competitor data based on KPIs, in accordance with some examples. The user interface 700 includes a product search input box 702, a customize columns button 704, a column selector 706, filters 708 and a list of products 710. In one or more embodiments, the merchandising system 212 presents the user interface 700 in response to user input to view competitor data (e.g., via the competitive data tab 516).

As noted above with respect to competitor data, the user interface 500 of FIG. 5 includes selectors (e.g., context selector 504, catalog selector 506) for browsing products by context (e.g., category/subcategory, brand and/or specific product) and/or catalog (e.g., by region, type of device, time period and/or user segment). The merchandising system 212 presents the user interface 700 based on corresponding user selections.

The list of products 710 includes product-related values (e.g., KPIs) organized by column. The columns are user-customizable by the operator (e.g., agent). For example, selection of the customize columns button 704 surfaces the column selector 706, by which the user can toggle individual columns corresponding to respective KPI values. Each column within the list of products 710 is user-selectable for sorting the list of products in ascending and/or descending order based on the respective values for that column. In this manner, the end user is able to quickly visualize competitor prices and/or margin opportunities among multiple product(s).

With respect to the column selector 706, the user-selectable columns may include total product price (e.g., depicted as "my total price" and corresponding to product price plus product shipping price), competitor price (e.g., of the cheapest competitor as noted above), price difference, competitor name, competitor shipping price, product shipping price (e.g., depicted as "my shipping price"), and/or competitor total price. In the example of FIG. 7, the user-selected columns for the list of products 710 include the total product price, the competitor price, the product price, and the price difference.

In one or more embodiments, the filters 708 allow the user to filter the list of products 710. For example, the user may select value ranges with respect to the categories, product prices, whether the competitor products are limited to internet shopping (e.g., only online resellers), whether the competitor products are limited to buy box resources (e.g., when one reseller is displayed by default for purchasing or adding a product to the cart), and competitor product price range. The data analysis system 204 in conjunction with the merchandising system 212 is configured to filter the list of products 710 based on the user-submitted values.

In one or more embodiments, the user interface 700 may include an export table button (not shown). User selection of the export button causes the experience analytics server 116 provides for downloading and saving a file (e.g., an .xlsx file) containing the list of competitor's offers for products of the selected category/brand. In one or more embodiments, the file corresponds to a table with all available columns available (not only the visible ones selected via the column selector 706), including a column with the name of the reseller (e.g., competitor).

Figure 8A:
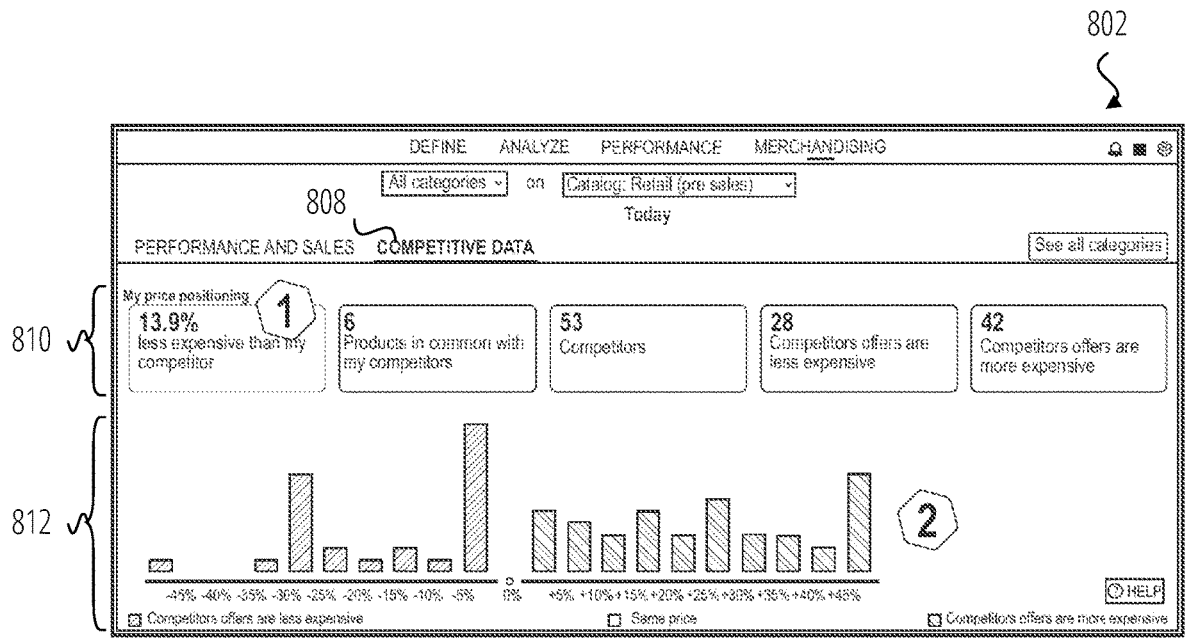
FIGS. 8A-8C illustrate example user interfaces for displaying competitor data, in accordance with some examples.
Figure 8B:
Figure 8C:
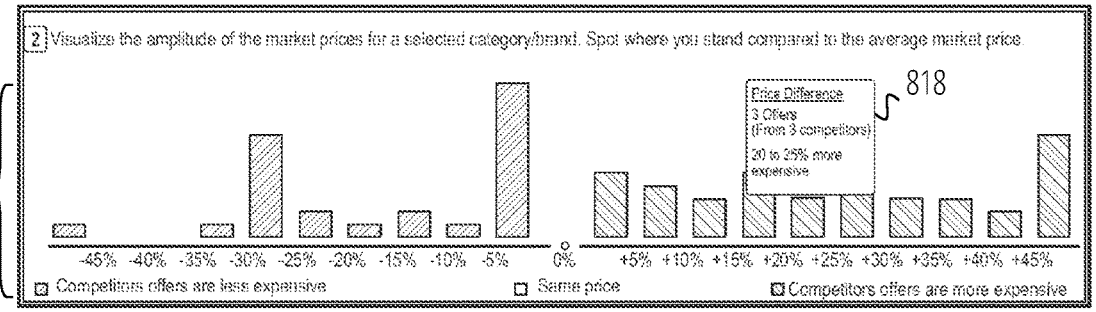

FIGS. 8A-8C illustrate example user interfaces 802-804 for displaying competitor data, in accordance with some examples. For example, the user interface 802, user interface 804 and user interface 806 provide for browsing by competitor data. In one or more embodiments, the merchandising system 212 presents the user interfaces 802-806 in response to user input to view competitor data (e.g., via the competitive data tab 808, or the competitive data tab 516 in FIG. 5).

As noted above with respect to competitor data, the user interface 500 of FIG. 5 includes selectors (e.g., context selector 504, catalog selector 506) for browsing products by context (e.g., category/subcategory, brand and/or specific product) and/or catalog (e.g., by region, type of device, time period and/or user segment). The merchandising system 212 presents the user interfaces 802-806 based on corresponding user selections, for example, to facilitate understanding the size and trends of the market for a specific category/brand.

The user interface 802 includes price positioning information 810 and a graph interface 812. The price positioning information 810 may indicate an average price difference (e.g., in percentage) based on products sold by the website relative to competitor prices. The price positioning information 810 may further indicate the number of given products, number of competitors, the number of competitors with less expensive products, and the number of competitors with more expensive products. The graph interface 812 includes user-selectable options to graph data corresponding to the price positioning information 810 by more expensive competitors, less expensive competitors, and competitors with the same price.

The price information 814 of the user interface 804 includes further price information for given products. One or more values of the price information 814 may be displayed in association with the price positioning information 810 of FIG. 8A. The price information 814 may include values such as market price, product price (e.g., "my price"), the number of competitors, the number of competitors with less expensive products, and the number of competitors with more expensive products. The market price may correspond to the average price calculated from competitors, compared to the subject price (e.g., client price). As noted, such pricing data may be stored within the merchandising tables 314 of the database 300.

The user interface 806 includes a graph interface 816 with user-selectable options to graph data corresponding to the price positioning information 810 by more expensive competitors, less expensive competitors, and competitors with the same price. In the example of FIG. 8C, the user interface 806 further includes price difference information 818.

In one or more embodiments, the user interface 806 may be generated (e.g., by the merchandising system 212) to facilitate visualizing the amplitude of the market prices for a selected category/brand (e.g., the spot where the client stands compared to the average market price). In one or more embodiments, prices are shown in percentages: 10% more expensive, 50% less expensive, and the like.

While not all variations are shown in the examples of FIGS. 8A-8C, the merchandising system 212 is configured to present competitor data with respect to one or more of given product(s), given competitor(s) and a competitor list. For example, with respect to a given product, the merchandising system 212 may present user interface 804, but specific to the product. Moreover, with respect to given competitor(s) and/or a competitor list, the merchandising system 212 is configured to calculate and present, for each competitor, the price difference (e.g., in %) between the product price and that of the competitor.

Figure 9:
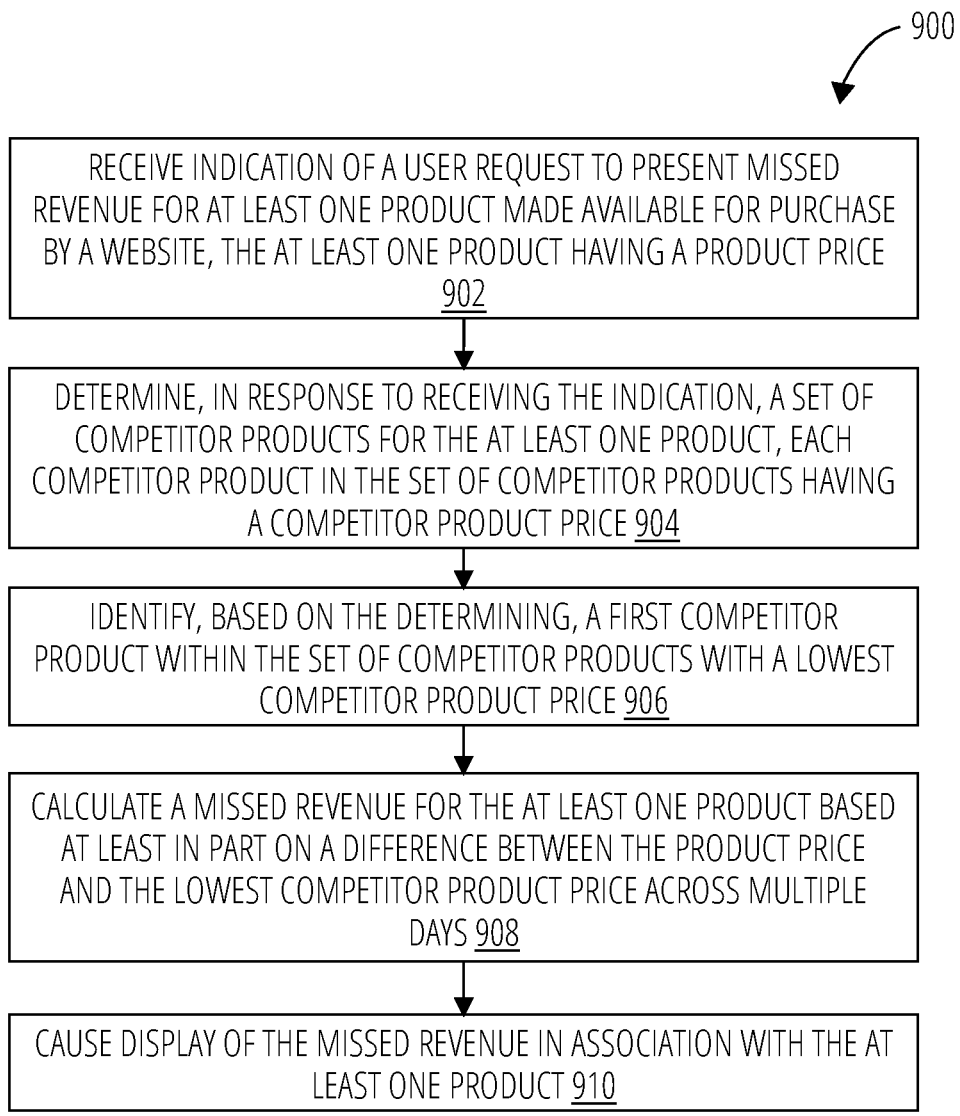
FIG. 9 is a flowchart illustrating a process for presenting missed revenue based on competitor data, in accordance with some examples.

FIG. 9 is a flowchart illustrating a process 900 for presenting missed revenue based on competitor data, in accordance with some examples. For explanatory purposes, the process 900 is primarily described herein with reference to the experience analytics server 116 of FIG. 1. However, one or more blocks (or operations) of the process 900 may be performed by one or more other components, and/or by other suitable devices. Further for explanatory purposes, the blocks (or operations) of the process 900 are described herein as occurring in serial, or linearly. However, multiple blocks (or operations) of the process 900 may occur in parallel or concurrently. In addition, the blocks (or operations) of the process 900 need not be performed in the order shown and/or one or more blocks (or operations) of the process 900 need not be performed and/or can be replaced by other operations. The process 900 may be terminated when its operations are completed. In addition, the process 900 may correspond to a method, a procedure, an algorithm, etc.

The experience analytics server 116 receives indication of a user request to present missed revenue for at least one product made available for purchase by a website, the at least one product having a product price (block 902). The experience analytics server 116 may receive indication of a second user request to view products at a product level, a category level or a brand level, the products being made available for purchase by the website, and determine the at least one product based on the second user request.

The experience analytics server 116 determines, in response to receiving the indication, a set of competitor products for the at least one product, each competitor product in the set of competitor products having a competitor product price (block 904). The experience analytics server 116 identifies, based on the determining, a first competitor product within the set of competitor products with a lowest competitor product price (block 906).

The experience analytics server 116 calculates a missed revenue for the at least one product based at least in part on a difference between the product price and the lowest competitor product price for a given time period (block 908). The product price may be less than the lowest competitor product price, and the missed revenue may represent an opportunity to increase the product price.

The experience analytics server 116 causes display of the missed revenue in association with the at least one product (block 910). The experience analytics server 116 may determine key performance indicators (KPIs) that relate to the at least one product, the KPIs being based at least in part on prior session events related to purchase of the at least one product, and cause display of the KPIs in association with the at least one product. The KPIs may include a market price determined by averaging the competitor product prices. The KPIs may include a price difference determined by averaging a price difference between the product price and the competitor product prices.

The at least one product may correspond to plural products. Determining the set of competitor products, identifying the first competitor product, calculating the missed revenue, and causing display of the missed revenue are performed for each product of the plural products.

Machine Architecture

Figure 10:
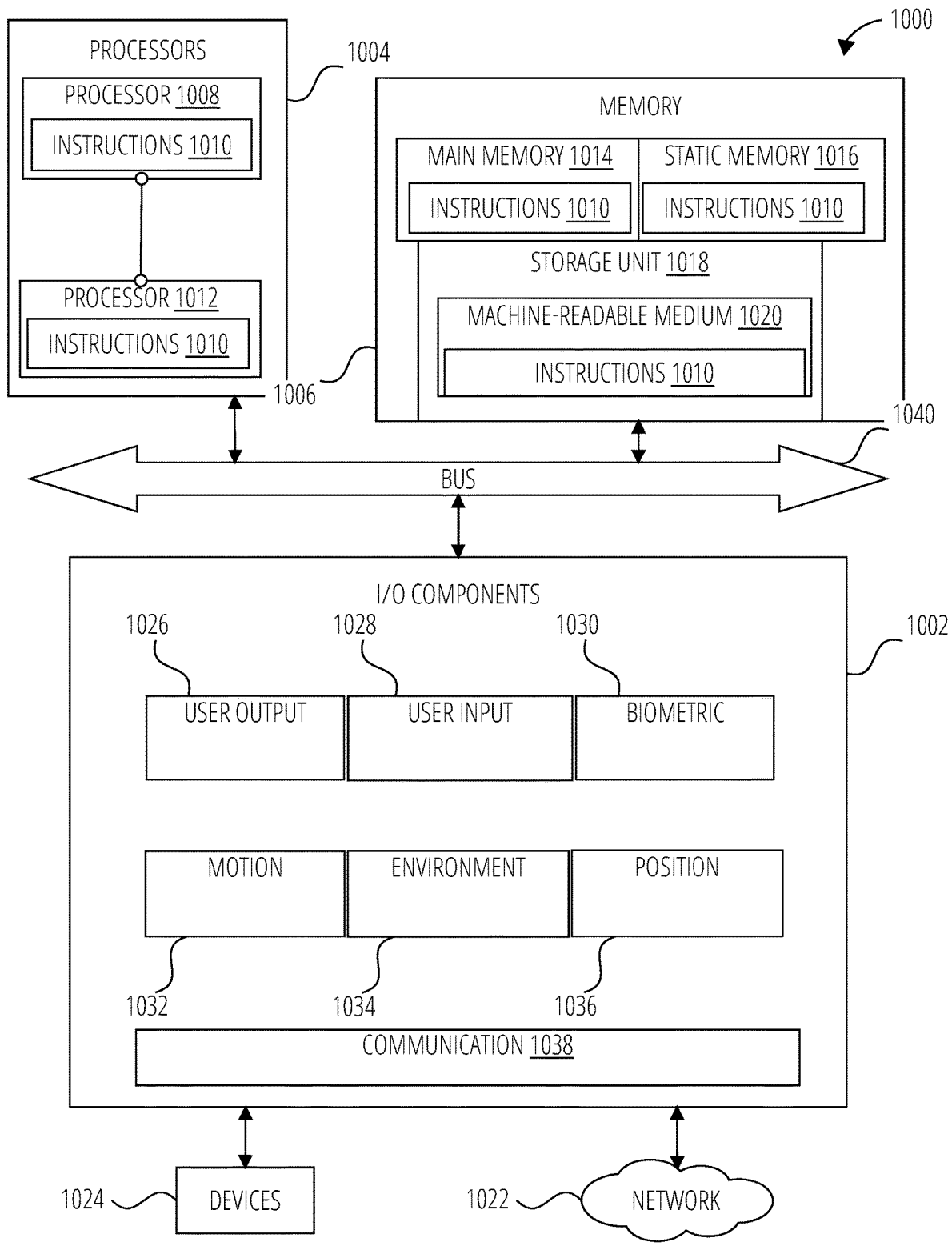
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an application, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the member client device 102 or any one of a number of server devices forming part of the experience analytics server 116. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
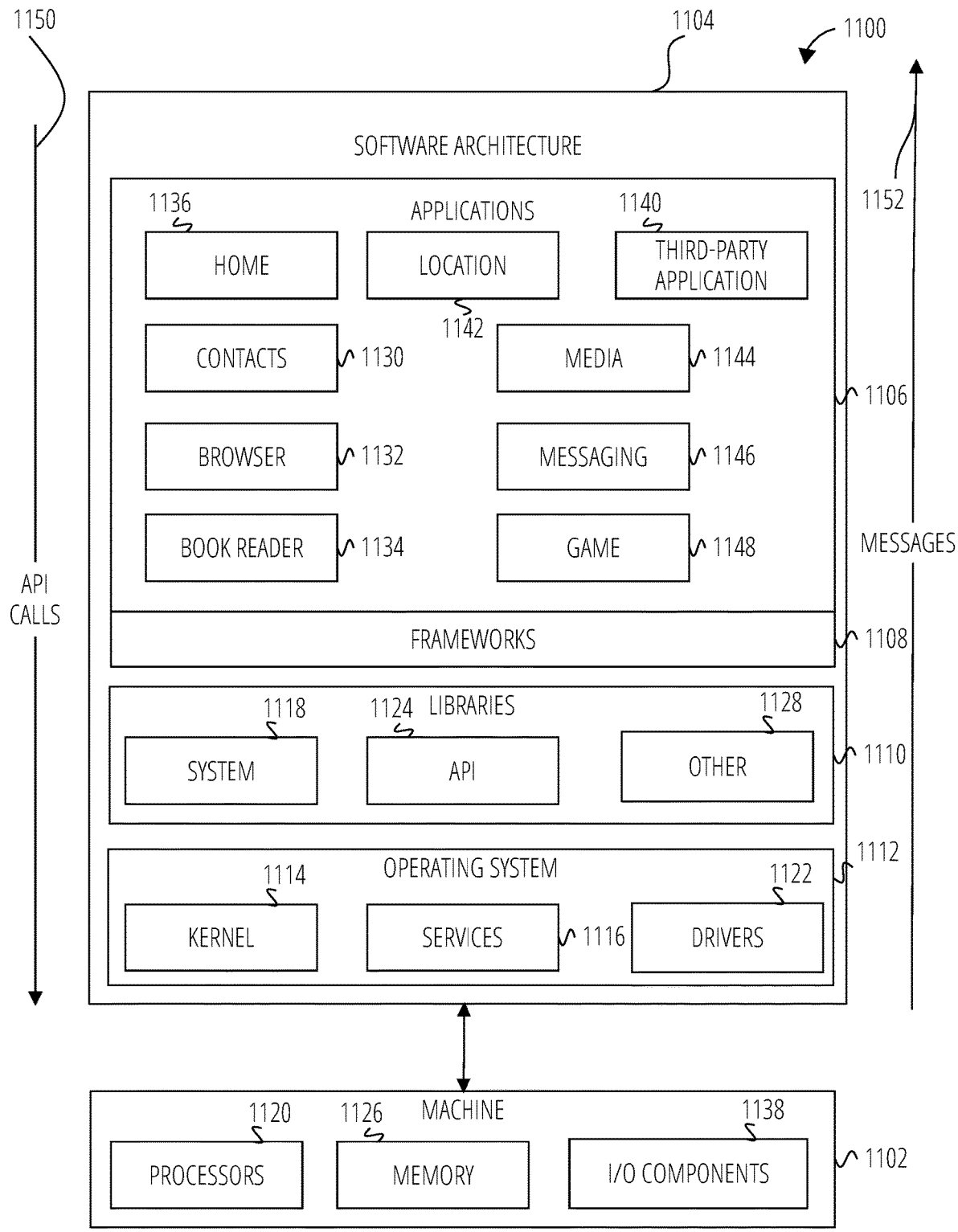
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method, comprising:
providing client-side scripts for one or more first devices that access a website, the client-side scripts being configured to record session data corresponding to user interaction with the website;
generating session events based on the session data recorded using the client-side scripts;
receiving, from a second device, indication of a user request to present missed revenue for at least one product made available for purchase by a website, the at least one product having a product price;
determining, in response to receiving the indication, a set of competitor products for the at least one product, each competitor product in the set of competitor products having a competitor product price;

identifying, based on the determining, a first competitor product within the set of competitor products with a lowest competitor product price;

calculating, upon determining that the product price is less than the lowest competitor product price, a missed revenue for the at least one product based at least in part on a difference between the product price and the lowest competitor product price for a given time period;

determining key performance indicators (KPIs) that relate to the at least one product, the KPIs being based at least in part on the session events, the session events being related to purchase of the at least one product;

causing display, on the second device, of the missed revenue and the KPIs in association with the at least one product;

causing display of a user interface on the second device, the user interface being configured to receive user selection of a session, from among plural user sessions with the website, for replay on the second device, the plural user sessions corresponding to different versions of the website; and reconstructing, upon receiving user selection of the session via the user interface, a video of the session based on the generated session events corresponding to the session, for replay on the second device.

2. The method of claim 1, further comprising:

receiving indication of a second user request to view products at a product level, a category level or a brand level, the products being made available for purchase by the website; and determining the at least one product based on the second user request.

3. The method of claim 1, wherein the at least one product comprises plural products, and wherein determining the set of competitor products, identifying the first competitor product, calculating the missed revenue, and causing display of the missed revenue are performed for each product of the plural products.

4. The method of claim 1, wherein missed revenue represents an opportunity to increase the product price.

5. The method of claim 1, wherein the KPIs comprise a market price determined by averaging the competitor product prices.

6. The method of claim 1, wherein the KPIs comprise a price difference determined by averaging a price difference between the product price and the competitor product prices.

7. The method of claim 1, wherein the one or more first devices correspond to visitors of the website, and wherein the second device corresponds to a host of the website.

8. A system comprising:

a processor; and a memory storing instructions that, when executed by the processor, configure the processor to perform operations comprising:

providing client-side scripts for one or more first devices that access a website, the client-side scripts being configured to record session data corresponding to user interaction with the website;

generating session events based on the session data recorded using the client-side scripts;

receiving, from a second device, indication of a user request to present missed revenue for at least one product made available for purchase by a website, the at least one product having a product price;

determining, in response to receiving the indication, a set of competitor products for the at least one product, each competitor product in the set of competitor products having a competitor product price;

identifying, based on the determining, a first competitor product within the set of competitor products with a lowest competitor product price;

calculating, upon determining that the product price is less than the lowest competitor product price, a missed revenue for the at least one product based at least in part on a difference between the product price and the lowest competitor product price for a given time period;

determining key performance indicators (KPIs) that relate to the at least one product, the KPIs being based at least in part on the session events, the session events being related to purchase of the at least one product;

causing display, on the second device, of the missed revenue and the KPIs in association with the at least one product;

causing display of a user interface on the second device, the user interface being configured to receive user selection of a session, from among plural user sessions with the website, for replay on the second device, the plural user sessions corresponding to different versions of the website; and reconstructing, upon receiving user selection of the session via the user interface, a video of the session based on the generated session events corresponding to the session, for replay on the second device.

9. The system of claim 8, the operations further comprising:

receiving indication of a second user request to view products at a product level, a category level or a brand level, the products being made available for purchase by the website; and determining the at least one product based on the second user request.

10. The system of claim 8, wherein the at least one product comprises plural products, and wherein determining the set of competitor products, identifying the first competitor product, calculating the missed revenue, and causing display of the missed revenue are performed for each product of the plural products.

11. The system of claim 8, wherein missed revenue represents an opportunity to increase the product price.

12. The system of claim 8, wherein the KPIs comprise a market price determined by averaging the competitor product prices.

13. The system of claim 8, wherein the KPIs comprise a price difference determined by averaging a price difference between the product price and the competitor product prices.

14. A non-transitory computer-readable storage medium, the computer-readable storage medium including instructions that when executed by a computer, cause the computer to perform operations comprising:

providing client-side scripts for one or more first devices that access a website, the client-side scripts being configured to record session data corresponding to user interaction with the website;

generating session events based on the session data recorded using the client-side scripts;

receiving, from a second device, indication of a user request to present missed revenue for at least one product made available for purchase by a website, the at least one product having a product price;

determining, in response to receiving the indication, a set of competitor products for the at least one product, each competitor product in the set of competitor products having a competitor product price;

identifying, based on the determining, a first competitor product within the set of competitor products with a lowest competitor product price;

calculating, upon determining that the product price is less than the lowest competitor product price, a missed revenue for the at least one product based at least in part on a difference between the product price and the lowest competitor product price for a given time period;

determining key performance indicators (KPIs) that relate to the at least one product, the KPIs being based at least in part on the session events, the session events being related to purchase of the at least one product;

causing display, on the second device, of the missed revenue and the KPIs in association with the at least one product;

causing display of a user interface on the second device, the user interface being configured to receive user selection of a session, from among plural user sessions with the website, for replay on the second device, the plural user sessions corresponding to different versions of the website; and reconstructing, upon receiving user selection of the session via the user interface, a video of the session based on the generated session events corresponding to the session, for replay on the second device.

15. The computer-readable medium of claim 14, the operations further comprising:

receiving indication of a second user request to view products at a product level, a category level or a brand level, the products being made available for purchase by the website; and determining the at least one product based on the second user request.

16. The computer-readable medium of claim 14, wherein the at least one product comprises plural products, and wherein determining the set of competitor products, identifying the first competitor product, calculating the missed revenue, and causing display of the missed revenue are performed for each product of the plural products.

17. The computer-readable medium of claim 14, wherein missed revenue represents an opportunity to increase the product price.

18. The computer-readable medium of claim 14, wherein the KPIs comprise a market price determined by averaging the competitor product prices.

* * * * *

UNITED STATES PATENT AND TRADEMARK OFFICE
CERTIFICATE OF CORRECTION

| | | |
|---|---|---|
| PATENT NO. | : 12,062,062 B2 | Page 1 of 1 |
| APPLICATION NO. | : 18/090758 | |
| DATED | : August 13, 2024 | |
| INVENTOR(S) | : Colombier et al. | |

It is certified that error appears in the above-identified patent and that said Letters Patent is hereby corrected as shown below:

In the Specification

In Column 6, Line 27, delete "web site" and insert --website-- therefor

In Column 7, Line 41, delete "web site," and insert --website,-- therefor

In Column 8, Line 22, delete "web site" and insert --website-- therefor

In Column 10, Line 11, delete "web site" and insert --website-- therefor

In Column 17, Line 58, delete "I/O" and insert --(I/O)-- therefor

In Column 18, Line 13, delete "1006," and insert --1014,-- therefor

Signed and Sealed this
Thirtieth Day of September, 2025

John A. Squires
*Director of the United States Patent and Trademark Office*